United States Patent
Zucchelli

(10) Patent No.: US 9,051,449 B2
(45) Date of Patent: Jun. 9, 2015

(54) FLAME RETARDED EXTRUDED POLYSTYRENE FOAMS

(75) Inventor: Ugo Zucchelli, San Benigno (IT)

(73) Assignee: ITALMATCH CHEMICALS S.p.A., San Benigno (Genova) (IT)

( * ) Notice: Subject to any disclaimer, the term of this patent is extended or adjusted under 35 U.S.C. 154(b) by 0 days.

(21) Appl. No.: 14/124,837

(22) PCT Filed: Jun. 8, 2011

(86) PCT No.: PCT/IB2011/001261
§ 371 (c)(1),
(2), (4) Date: Mar. 11, 2014

(87) PCT Pub. No.: WO2012/168746
PCT Pub. Date: Dec. 13, 2012

(65) Prior Publication Data
US 2014/0303294 A1    Oct. 9, 2014

(51) Int. Cl.
| C08K 5/34 | (2006.01) |
| C08K 5/3492 | (2006.01) |
| C08J 9/00 | (2006.01) |
| C08K 5/00 | (2006.01) |
| C08K 3/32 | (2006.01) |
| C08K 5/02 | (2006.01) |
| C08K 5/13 | (2006.01) |
| C08K 5/136 | (2006.01) |
| C08K 5/3432 | (2006.01) |
| C08K 5/01 | (2006.01) |

(52) U.S. Cl.
CPC ........... *C08K 5/34922* (2013.01); *C08J 9/0061* (2013.01); *C08K 5/0066* (2013.01); *C08J 2201/03* (2013.01); *C08J 2325/06* (2013.01); *C08K 3/32* (2013.01); *C08K 5/01* (2013.01); *C08K 5/34928* (2013.01); *C08K 5/02* (2013.01); *C08K 5/13* (2013.01); *C08K 5/136* (2013.01); *C08K 5/3432* (2013.01)

(58) Field of Classification Search
USPC ............................................................ 524/99
See application file for complete search history.

(56) References Cited

U.S. PATENT DOCUMENTS

| 4,436,854 A | 3/1984 | Brandstetter et al. |
| 5,171,757 A | 12/1992 | Stobby et al. |
| 5,256,718 A | 10/1993 | Yamamoto et al. |
| 7,619,022 B2 * | 11/2009 | Costanzi ................. 524/414 |
| 7,851,558 B2 * | 12/2010 | King et al. ............... 525/331.9 |
| 8,293,846 B2 * | 10/2012 | Kano et al. ............... 525/330.3 |
| 2010/0273925 A1 | 10/2010 | Allmendinger et al. |

FOREIGN PATENT DOCUMENTS

WO    WO 00/12593    3/2000

OTHER PUBLICATIONS

Translation and patent of CN 101880409, Nov. 10, 2010.*
International Search Report for PCT/IB2011/001261, mailed Oct. 11, 2011.
Written Opinion of the International Searching Authority for PCT/IB2011/000455, mailed Oct. 24, 2011.

* cited by examiner

*Primary Examiner* — Hui Chin
(74) *Attorney, Agent, or Firm* — Nixon & Vanderhye P.C.

(57) ABSTRACT

The invention relates to flame retarded extruded polystyrene foams with a very low halogen content in the final product, i.e. containing a very low content of hexabromocyclododecane or preferably hexabromocyclododecane free, and a process for their preparation. The invention also relates to their use in construction, as building thermal insulating materials, or in transportation.

21 Claims, No Drawings

FLAME RETARDED EXTRUDED POLYSTYRENE FOAMS

This application is the U.S. national phase of International Application No. PCT/IB2011/001261, filed 8 Jun. 2011, the entire contents of each of which are hereby incorporated by reference.

SUBJECT OF THE INVENTION

The invention relates to flame retarded extruded polystyrene foams with a very low halogen content in the final product, i.e. containing a very low content of hexabromocyclododecane or preferably hexabromocyclododecane free, and a process for their preparation. The invention also relates to their use in construction, as building thermal insulating materials, or in transportation.

BACKGROUND OF THE INVENTION

It has well known that polystyrene foam polymers are particularly sensitive to the ignition with flame, and this is the reason why they need a suitable protection, in terms of flame retardant properties. According to the prior art, the flame retardant property is achieved by means of addition of at least an organic halogenated compound, particularly a brominated compound, such as hexabromocyclododecane, with or without other additives such as, for example, antacids, dripping promoters, nucleators.

Hexabromocyclododecane is, however, under public and regulatory pressure, due to its intrinsic characteristics, to the possibility that its use could cause bioaccumulation in the environment, as well as due to the strong pressure which exists in order to avoid the use of halogenated compounds in polymeric compositions.

In view of the above, intensive research is ongoing to find suitable substitute compounds or compositions, which allow to avoid the use of halogen derivatives in flame retarded polymeric compositions.

Generally speaking, the "new generation" of flame retardant compositions, should fulfill some basic requirements, here below schematically indicated:
  Flame Retardant (FR) additives should have an halogen content as low as possible for environmental reasons;
  FR additives total loading should be as low as possible in order to not affect mechanical properties of the composition;
  FR additives should have suitable thermal resistance to be processed safely at temperatures of at least 180° C. or higher, for example up to 250° C.;
  FR additives should have low toxicity;
  FR additives should be fully colorable, i.e. the color of the final polymeric composition containing the flame retardant agent should be as closed as possible to the same composition in the absence of FR additive.

It is known that the above requirements can be achieved by using metal inorganic hypophosphites into the polymer blend with or without halogen containing additives. However, when special and particular polymers are considered, the use of metal inorganic hypophosphites as flame retardant additives, does not suffice in order to obtain good and satisfactory flame retardant properties.

In this cases, it could be necessary to introduce at least an additional essential compound into the composition, such as, for example, a radical initiator, also herein called "organic synergic". This kind of compound could be helpful in order to improve the flame retardant properties of the final polymeric composition.

When the thermoplastic polymer is polystyrene, an aromatic polymer made from the aromatic monomer styrene, it is necessary to face with additional problems in formulating a good flame retarded polystyrene composition. In fact, for example extruded foams of polystyrene (X-PS) are commonly widely used in constructions, for building insulation, and as packing material, and for these reasons their flame retardant characteristics are very relevant.

Usually, due to their use in constructions, it is necessary to improve the flame retardant properties of extruded polystyrene foams with respect to other polymeric composition, and, at the same time, it is also necessary to decrease the amount of halogenated flame retardant agents in the polymeric composition, due to environmental and safety reasons. For the above reasons, it is well known that at least a certain amount of halogenated compound, if not the total of it, could be replaced by a so called "organic synergic", which is a radical initiator, as well as accompanied by the presence of metal inorganic hypophosphites, as already explained above.

For example, US 2009/0149561 describes polymer foams prepared using 5,5-bis(bromomethyl)-2-oxo-1,3,2-dioxaphosphorinane or brominated 2-oxo-1,3,2-dioxaphosphorinane compounds. The minimum content of bromine in the reported examples are, however, equal to 0.8% by weight on the total percentage of the composition, which is, in any case, a still quite high amount.

WO 2010/083068 teaches a polystyrene foam composition containing at least 0.8% by weight on the total percentage of the composition of bromine and at least 1.5% by weight on the total percentage of the composition of graphite. These compositions also contain a quite relevant amount of halogen compound and are not fully colorable because of the presence of graphite.

WO 2008/039833 discloses polystyrene foam compositions with very low color, containing N, 2-3-dibromopropyl-4,5-dibromohexahydrophthalimide, a flame retardant agent (FR) that does not tend to degrade when processed. However, the preferred concentration of the FR agent is between 3% and 4% by weight on the total percentage of the composition and, more particularly 3.5% by weight on the total percentage of the composition, thus corresponding to a bromine content of 2.2% by weight on the total percentage of the composition.

US 2008/0058435 discloses polystyrene foam compositions free from halogen or with low amounts of halogen, containing 9,10-dihydro-9-oxa-phosphenanthrene 10 oxide (DOP) and its derivatives, hydrolysis products or metal salts. This compound is an organic phosphinate, with the oxidation state of phosphorus being formally in the +1 value.

Thermoplastic molding compositions containing a polyolefin polymer, particularly polypropylene, at least an inorganic hypophosphite and an halogen containing flame retardant agent as synergistic mixture, are described in WO 2007/010318. The disclosed composition also contains an organic compound, able to form free radicals during flaming. This compound was added to the disclosed composition in order to improve flame retardant properties of the polymeric composition. Despite the fact that WO 2007/010318 discloses in general terms polyolefin polymers (and explicitly mentions styrene, methyl styrene and corresponding copolymers) as suitable for being flame retarded as compositions containing at least an inorganic hypophosphite and an halogen containing flame retardant agent as synergistic mixture, the experimental part and all the evidences of an effective flame retardant characteristic are indicated only when polypropylene is chosen as polyolefinic polymer. No example is included for different polyolefins.

OBJECT OF THE INVENTION

It is an object of the present invention to provide flame retarded polystyrene foam compositions and articles based on said polystyrene foam, having good mechanical properties, good insulating properties along with very good flame retardant properties.

Another object of the present invention is to provide polystyrene foam compositions and articles characterized by very good flame retardant properties, mechanicals properties and thermal insulating properties that are characterized by a very low content of halogenated compounds, particularly they are free from hexabromocyclododecane.

Still another object of the present invention is to provide polystyrene foam compositions and articles characterized by good flame retardant properties, mechanicals properties and thermal insulating properties that contain an overall low halogen concentration level.

A further object of the present invention is to provide polystyrene foam compositions and articles characterized by good flame retardant properties, mechanicals properties and thermal insulating properties that show low smoke opacity and toxicity.

Still an object of the present invention is to provide flame-retarded thermoplastic moulding compositions (masterbatches) to be used in the preparation of flame retarded foamed articles.

Still another object of the present invention is to provide a process for the preparation of flame retarded foam compositions and related articles, based on polystyrene resins.

DETAILED DESCRIPTION OF THE INVENTION

The invention relates to flame retarded extruded polystyrene foamed compositions containing, as essential components, a polystyrene polymer (A), at least an inorganic hypophosphite (B), at least an halogen containing flame retardant agent (C), a so called "organic synergic" or "radical initiator (RI)" having chain breaking activity and containing a C—C or O—O chemical bond (D) and, optionally, a so called "radical stopper" (E) and optionally a polar polymer containing functional groups (F).

The composition according to the invention has very good mechanicals, insulating and flame retardant properties but, at the same time, is characterized by a very low content of halogenated compound and it is free of hexabromocyclododecane.

It was noted that, the substitution of at least a part of the halogenated compound with the inorganic hypophosphite and the so called "organic synergic" or "radical initiator", resulted in a decrease in the viscosity of the polymer, depending on the radical initiator (RI) concentration, on melt temperatures and on the permanent time of the melted mass into the extruder. This aspect of the molecular weight reduction after processing, even though can be considered not relevant in several polymeric compositions, for example in polyolefinic compositions where the polymer is, for example polypropylene, become dramatically relevant in polystyrene compositions.

It has been found that, contrary to the teaching of the prior art, for example that referred to as WO 2007/010318, the composition according to the present invention provides satisfactory flame retardant activity only when polystyrene polymers compositions, after processing, have a molecular weight (MW) that is at least about 90% of the polystyrene in an identical composition without the flame retardant compounds or the RI. According to the present invention, molecular weights (MWs) are calculated according to GPC measurements described in the experimental part.

Thus, the optional presence of the so called "radical stopper" in the polystyrene mixture, allows to keep the viscosity of the polymer almost unchanged even in presence of the so called "radical initiator", and surprisingly keep also the flame retardancy activity high. Without being linked to any theory, it is possible that the radical activity of the RI on polystyrene melt result in both chain breaking and cross linking of the polymer. It is possible that the cross linked portion of the polystyrene does change the zero-shear rheology of the polymer itself, avoiding or at least retarding the dripping out of flaming droplets during the flame test and permitting the flame to propagate further without extinguishing.

Blowing agents are introduced during extrusion at high pressure to form an homogeneous composition. These blowing agents must have a boiling point lower to the boiling point of the expandable polystyrene and may be flammable or not flammable. They may be used alone or in combinations.

Examples of useful blowing agents are carbon dioxide, water, nitrogen or aliphatic hydrocarbons having 3 to 5 carbons, alcohols, ketones and ethers.

Traditional fluorinated or chlorinated hydrocarbons, like CFCs and HCFCs are phasing out as blowing agent for plastic processes, according to the Kyoto Protocol.

These expanding agents are very often used in mixtures, and are typically employed in amounts comprised in the range between 1 to 30% by weight with respect to the total weight of the expandable material. During the foaming process, blowing agents are dispersed as uniform as possible, then leaved to expand at reduced or atmospheric pressure.

Various factors influence the porosity and the cellular structure resulting from the foaming process.

Temperature and throughput rate during extrusion as well as material parameters such as viscosity strongly affect the foaming behavior. To achieve a maximum density reduction of the foam and a fine homogeneous cellular structure, the processing conditions as well as the material parameters of the polymer (mainly molecular weight) have to be optimized. The nucleation of cells is strongly influenced by the rate and the height of the pressure drop at the end of the die. There are two major types of nucleation: homogeneous nucleation and heterogeneous nucleation. Homogeneous nucleation occurs at the bulk phase of the polymer matrix. On the other hand, heterogeneous nucleation occurs at the interface between a solid phase and the polymer.

"Nucleators additives" are used to improve foam quality. Generally speaking, nucleators are inorganic filler like, not melting particulate substances. According to the classical nucleation theory, heterogeneous nucleation requires less energy to take place and result in higher cell density as well as smaller and uniform cell size distribution. Talc is widely used as a nucleating agent to give better quality to foams, due to high cell density and small cell size.

The flame retardant mixture claimed in present invention has shown a so called "hyper nucleation effect" with some expanding agents mixtures in some equipments.

"Hyper nucleation" result in low die pressures, too low cell size and final density. Interfacial tension at different interfaces and surface geometries at various heterogeneous nucleating sites are important factors that govern the heterogeneous nucleation rate. Introduction of a so called "polar polymer" was found to delay the foaming process, very likely due to increase in compatibility between the polymer and the inorganic flame retardant, which reduce the likeness of heterogeneous nucleation to occur. Thus, the optional presence of the so called "polar polymer" in the polystyrene mixture, allows to reduce the nucleation effect of the inorganic hypophosphite or inorganic halogen on the PS foam permitting a smooth processing ability.

The present invention solves the above cited problems by providing a flame-retarded expanded polystyrene foam based on a composition containing:
(A) at least a polystyrene polymer,
(B) at least an inorganic hypophosphite as flame retardant compound,
(C) at least an halogen containing flame retardant compound,
(D) at least a so called "organic synergic" or "radical initiator" (RI) and, optionally
(E) at least a so called "radical stopper" (RS)
(F) at least a polar polymer containing oxygen
wherein the flame retarded expanded polystyrene foam has a molecular weight (MW) of at least about 90% of the polystyrene in an identical composition without the flame retardant compounds.

According to the present invention, the inorganic hypophosphites contained in the mixture in a determined ratio allows to reduce the total halogen content needed to pass the specific FR standard, and also to reduce smoke opacity and toxicity, decreasing degradation of the polymer and improving discoloration (yellowing), without affecting all other attractive properties of the foam itself.

Single components of the claimed compositions are here described in further details:
a) Inorganic Hypophosphite Inorganic hypophosphites are synonymous of hypo phosphorus acid metal salts, and can be any product with the following chemical formula:

where:
n is an integer number ranging from 1 to 4 in dependence of the valence of the metal Me. The metal is any atom belonging to the groups I, II, III and IV of the periodic table of the elements, however the preferred products are the commercially available hypophosphorous acid salts of sodium, calcium, manganese, zinc and aluminium, being the most preferred calcium hypophosphite and aluminium hypophosphite.

The hypophosphorous acid metal salts appears as white solid powder which does not melt under the usual processing temperatures of polymers, therefore it is advisable that the average particle size (D50%) of the powder is lower than 40 µm and the highest particle size is below 100 µm, more preferably D50% should be below 15 µm and the highest particle size is below 30 µm.

Fine solids particles with size lower than about 1 microns increase the nucleating effect of the foam during extrusion. When present in relevant amounts, fine particles may increase too much the nucleating effect giving rise to foams with high density, so they have to be minimized in the powder product directly during milling operations or in a second separation step.

The hypophosphorous metal salt may be coated, for example according to the content of WO 2009/010812.
B) Halogen Containing Flame Retardant Agent In the meaning of the present invention, the halogenated compound can be any organic or inorganic product, meltable, not meltable or sublimating, with low molecular weight or polymeric, containing one or more bromine or chlorine atoms in a percentage ranging from about 10% to about 80% by weight with respect to the total weight of the composition. Bromine containing flame retardant compounds with a sufficiently high decomposition temperature, for example higher than about 150-180° C., are mostly preferred.

Melamine hydrobromide (1,3,5-triazine-2,4,6-triamine, hydrobromide) CAS 29305-12-2 is an example of an halogen organic salt that may be used as halogen containing flame retardant agent within the meaning of the present invention.

Tetrabromo bis phenol A bis(2,3-dibromopropyl ether) CAS 21850-44-2 is another example of an halogen containing flame retardant agent which contains in the same molecule both an aromatic and aliphatic moiety, and it is also within the meaning of the present invention.

Chloroparaffine is an additional example of chlorine containing flame retardant agent, also within the scope of the present invention.

Tris(tribromoneopentyl) phosphate CAS 19186-97-1 is a further example of an halogen containing flame retardant agent containing an aliphatic moiety and a phosphoric acid ester link, and it is also within the meaning of the present invention.

Tris-(2,4,6-tribromophenoxyl)-1,3,5-triazine CAS 25713-60-4 is another example of an halogen containing flame retardant agent containing an aromatic moiety and a nitrogenated ring, and it is also within the meaning of the present invention.

Tris-(2,3-dibromopropyl)isocyanurate CAS 52434-90-9 is an example of an halogen containing flame retardant agent containing an aliphatic moiety and a nitrogenated ring, and it is also within the meaning of present invention.

Brominated butadiene copolymers, as described in US 2008/0287559A1 are an example of halogen containing polymeric flame retardant agent, and they are particularly within the meaning of the present invention.

Brominated polystyrene CAS 88497-56-7 is an example of an halogen containing flame retardant agent containing aromatic moieties in a polymeric chain, and it is also within the meaning of the present invention.

Brominated epoxy oligomers CAS 68928-70-1 are an example of halogen containing flame retardant oligomers, and are also within the meaning of the present invention.

The halogenated compounds according to the present invention may be also used in a multiple combination, i.e. as mixtures.
C) Organic Chain Breaking Synergic or "Radical Initiator" (RI)

Novel thermoplastic molding compositions according to the present invention also contain organic compounds which are in a position to form free radicals during flaming. Said organic compounds, which enable a further reduction of the flame retard of the composition, can be for example selected among one or more of the following products: 2,3-dimethyl 2,3-diphenyl butane, 2,3-dimethyl 2,3-diphenylhexane, poly (1,4-diisopropyl benzene), dicumyl peroxide or di-tert-butyl peroxide. These products are generally used in an amount of between 0.01% to 1% by weight on the weight of total compound, preferably between 0.05% and 0.5% by weight with respect to the total weight of the composition.
D) "Radical Stopper" (RS) (Optional)

"Radical stopper" differs from existing general purpose thermal or process stabilizers, like hindered phenols or the like, because their ability to work effectively even in presence of an high radicals concentration. They are sometimes called "anti scorch" additives, and they are used in cross linked rubbers in presence of peroxides to delay the cross linking effect. Surprisingly, they are shown to work not only inhibiting radicals induced from compounds C) but even in imparting flame retardancy to the system. Some examples of commercially available Radical stopper are: di tert butylhydroquinone (CAS 88-58-4) and 4-hydroxyl-tetrahydrocarbylpiridin 1 oxyl, also called "hydroxyl-TEMPO" (CAS 2226-96-2).

E) Polar Polymer Containing Oxygen (Optional).

Polar Polymers commercially available include ethylenic or styrenic polymers containing acrylates or reactive carboxylic or anhydride group, as well as nitrils. They can be produced with any know catalyst or reacting processing and different molecular weight are within the scope of the invention. Examples are: EVA (Ethylene Vinyl Acetate), EMA (Ethylene Methyl Acrylate), EEA (Ethylene Ethyl Acrylate), EBA (Ethylene Butyl Acrylate), PVA (Poly Vinyl Aclohol), PE-g-MAH (Poly Ethyelen grafted Maleic Anhydride), SBS-g-MAH (Styrene Butadiene Rubber grafted Maleic Anhydride), PS-g-MAH (Polystyrene grafted Maleich Anhydride), ABS (Acrylonitrile Butadiene Rubber), SAN (Styrolo Acrylo Nitrile), or mixtures. These polar polymers are used to increase the cell size with some specific blowing agents mixtures, especially those based on CO2. The content of these polymers should be as low as possible, so to increase the cell size up to an acceptable dimension, so avoiding the so called "hyper nucleation" of the inorganic FR effect while not imparting substantially mechanical properties and flame retardancy of the final foam produced.

It has been surprisingly found that the objects of the present invention are satisfied with extruded foamed articles based on polystyrene homopolymer or copolymer having a density from about 15 kg/m$^3$ to about 60 kg/m$^3$ which comprise at least a combination of an inorganic hypophosphite, an halogen containing flame retardant compound, an organic synergic or RI with chain breaking activity, and optionally a radical stopper RS and/or a polar polymer containing oxygen. According to the present invention, the flame retarded extruded polymer foam thus exhibits excellent FR properties as indicated by various FR tests, a lower halogen content with respect to previously existing known products, a very low content of hexabromocyclododecane or they are hexabromocyclododecane free.

The flame retarded molding compositions according to the present invention comprise as flame retardant composition from about 0.5% to 3.5% by weight on weight of molding composition, preferably from 1.25% to 2.5% by weight, of a mixture based on at least an inorganic hypophosphite, at least an halogen containing compound, at least a chain breaking synergic or RI.

The weight ratio of inorganic hypophosphite to halogenated compound depends on the chemical nature of the halogenated products, however the final halogen content must be lower than 0.8% by weight on the total percentage of the composition and more preferably lower than 0.6% by weight on the total percentage of the composition.

Even if it is advisable that the content of the halogenated compound in the polymeric article results to be as lower as possible, according to the present invention the halogen content in the final article should be higher than 1000 ppm, because polymeric mixtures which contain less than 1000 ppm of halogen compound do not show satisfactory flame retardant properties.

Additionally, the novel thermoplastic molded composition may contain a plurality of conventional products selected among the groups of heat stabilisers, lubricants, nucleating agents, antacid components.

Examples of heat stabilisers are sterically hindered phenols and/or aromatic phosphites or phosphonites, to be used alone or in combination.

As lubricants are preferably long chain fatty acid, like stearic acid, or fatty acid salts, like calcium or zinc stearate, or montan waxes, or one ester or amide obtained by reacting saturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms. Such products are used in an amount of up to 0.5% by weight on the total weight of the polymeric composition with the purposes to reduce the shear stresses induced by the mechanical devices on the organic polymer and to enhance the dispersion of the inorganic materials in the polymer matrix.

It is also possible to premix the starting components with thermoplastic resins in order to prepare masterbatches which may contain the individual components or whole additives in a predetermined ratio then dilute them with additional polymer in an extruder device for producing pellets.

Polystyrenes used in foams, as described in the present invention, are preferably polystyrene homopolymers and blends of polystyrene homopolymers. To improve mechanical properties of the foam, other thermoplastics ma be incorporated with or without using a compatibilizer, in a concentration generally lower than that of the polystyrene fraction.

Extruded foamed articles of the present invention are based on polystyrene homopolymer and have a density from about 15 kg/m$^3$ to about 60 kg/m$^3$.

The density range is more preferably about 28-45 kg/m$^3$.

Density of the foam may be determined, for instance, according to ASTM D1622-08. Flammability of solid polymers may be easily assess using the worldwide diffused "UL-94" test (Underwriters Laboratories Standards). Despite UL-94 is not specifically designed for assessing flammability of foams, because in these kind of compounds fire behavior is different and fire tests are different, UL-94 it is in any case a suitable evaluation method for screening purposes. A UL-94 V2 rating it is considered a good candidate to pass other specific FR tests on polystyrene foams. Possible FR test on PS foams boards are on the other hand of the kind of "single flame burner test" like for instance those described in "DIN 4102-B2" or "EN 11952-2 ignitability test".

The invention is described in more detail with reference to the following examples which, however are not intended to restrict the scope of the invention.

EXAMPLES

1) Comparative Examples on Non-Polystyrene Resins

In the following examples the indicated materials were used as blends components:

Thermoplastics Resins:

Polyolefins

HDPE 1: Marlex HMM-TR-144 (High molecular weight ethylene-hexene copolymer, MFR 190° C./2.16 kg=0.18 gr/10', density=0.946 gr/cc)

HDPE 2: Eraclene ML 70 (Medium-low molecular weight HDPE homopolymer from slurry process, MFR 190° C./2.16 kg=2-3 gr/10', density=0.951 gr/cc)

HDPE 3: Eraclene MP 90 (Low molecular weight HDPE homopolymer, MFR 190° C./2.16 kg=7 gr/10', density=0.960 gr/cc)

LDPE: Riblene MP 30 (Medium molecular weight LDPE, MFR 190° C./2.16 kg=7.5 gr/10', density=0.925 gr/cc)

LLDPE 1: Clearflex FG308 (Medium molecular weight ethylene-octene copolymer, MFR 190° C./2.16 kg=1 gr/10', density=0.925 gr/cc)

LLDPE 2: Flexirene FG30 (Medium molecular weight ethylene-butene copolymer, MFR 190° C./2.16 kg=1 gr/10', density=0.92 gr/cc)

1-PB: Polybutene DP400M (polybutene-1 homopolymer, MFR 190° C./2.16 kg=15 hr/10', density=0.915 gr/cc)

PMP: TPX RT31 (polymethylpentene, MFR 260° C./5 kg=20 gr/10', density=0.83 gr/cc)

Ethylene Vinyl Acetate Copolymers

EVA: Greenflex ML 30 (VA=9%; MFR 190° C./2.16 kg=2.5 gr/10')

Polyamides

PA 6,6: Latamid 66 (polymer of hexamethylenediammine acid and adipic acid)

PA 6: Latamid 6 (polymer of epsilon caprolactam, low viscosity, thermally stabilized)

High Impact Styrenics

HIPS: Edistir R321P (Medium impact polystyrene, MFR 200° C./5 kg=15 gr/10', density=1.04 gr/cc)

ABS (polymer of Acrylonitril-Butadien-Styrol): Magnum 3904 (ABS mass continuous process, MFR 220° C./10 kg=4.5 gr/10', density=1.05 gr/cc)

TPO (Thermo Plasti Olefin), Plastomers

TPO-1: Hifax CA12A (Reactor grade TPO ex Titanium catalyst, ethylene propylene block copolymer, MFR 230° C./2.16 kg=1 gr/10', density=0.88 gr/cc, melting point=162° C.)

TPO-2: Hifax CA207A (Reactor grade TPO ex Titanium catalyst, ethylene propylene butene block copolymer, MFR 230° C./2.16 kg=7.5 gr/10', density=0.90 gr/cc, melting point=162° C.)

PLAS-1: Engage 8180 (Ethylene octene copolymer ex homogeneous solution Zirconium catalyst, MFR 190° C./2.16 kg=0.5 gr/10', density=0.863 gr/cc, melting point=47° C.)

PLAS-2: Exact 1019 (Ethylene octene copolymer ex homogeneous solution Zirconium catalyst, MFR 190° C./2.16 kg=19 gr/10', density=0.910 gr/cc, melting point=104° C.)

PBT: Ultradur B4520 (Medium viscosity PBT; MFR 250° C./2.16 kg=22 gr/10', density=1.3 gr/cc Flame Retardant Additives:

Phoslite™ IP-A (Aluminium hypophosphite) manufactured by Italmatch Chemicals Spa. The used powder has got an average particle size (d50%) of 5 μm and d 98% below 15 μm;

Phoslite™ IP-C (Calcium Hypophosphite) manufactured by Italmatch Chemicals Spa. The used powder has got an average particle size of 5 μm and d 98% below 15 μm;

Melamine hydrobromide manufactured by Italmatch Chemicals Spa; with average particle size (d50%) of 5 μm; herein briefly called "MHB", with halogen content around 35%

Tetrabromobisphenol A bis(2,3-dibromopropyl ether), CAS 21850-44-2, herein briefly called "TBBPA-BDBPE", with halogen content around 70%

Flame Retardants Synergic (RI):

2,3-dimethyl 2,3-diphenylbutane (Perkadox 30™) commercialized by Akzo.

Other Additives:

Lubricant/processing aid: Ethylenediammine BisStearate (EBS)

Lubricant/processing aid: Penta Erithrytol Tetra Stearate (PETS)

TABLE 1

Counter Examples C1 to C22 (polyolefins resins)

| | C1 | C2 | C3 | C4 | C5 | C6 | C7 | C8 | C9 | C10 | C11 | C12 |
|---|---|---|---|---|---|---|---|---|---|---|---|---|
| HDPE 1 (%) | 97 | 94 | 94.6 | | | | | | | | | |
| HDPE 2 (%) | | | | 97 | 94 | 94.6 | | | | 90 | 87.5 | 87.2 |
| HDPE 3 (%) | | | | | | | 97 | 94 | 94.6 | | | |
| LDPE (%) | | | | | | | | | | | | |
| Phoslite IP-A (%) | | | | | | | | | | 5 | 2.5 | 2.5 |
| Phoslite IP-C (%) | 1.8 | 3.6 | 3.6 | 1.8 | 3.6 | 3.6 | 1.8 | 3.6 | 3.6 | | | |
| Melagard MHB (%) | 0.9 | 1.8 | 1.8 | 0.9 | 1.8 | 1.8 | 0.9 | 1.8 | 1.8 | 5 | 10 | 10 |
| TBBPA-BDBPE (%) | | | | | | | | | | | | |
| Perkadox 30 (%) | | 0.3 | 0.6 | | 0.3 | 0.6 | | 0.3 | 0.6 | | | 0.3 |
| UL-94 3.2 mm | NC | NC | NC | NC | NC | NC | NC | NC | NC | NC | NC | NC |
| UL-94 1.6 mm | NC | NC | NC | NC | NC | NC | NC | NC | NC | NC | NC | NC |

| | C13 | C14 | C15 | C16 | C17 | C18 | C19 | C20 | C21 | C22 |
|---|---|---|---|---|---|---|---|---|---|---|
| HDPE 1 (%) | | | | | | | | | | |
| HDPE 2 (%) | 87.5 | 87.2 | | | | | | | | |
| HDPE 3 (%) | | | | | | | | | | |
| LDPE (%) | | | 95.8 | 96 | 95.8 | 96 | 94.8 | 95 | 94.8 | 95 |
| Phoslite IP-A (%) | 10 | 10 | 2 | 2 | 2 | 2 | | | | |
| Phoslite IP-C (%) | | | | | | | 3 | 3 | 3 | 3 |
| Melagard MHB (%) | 2.5 | 2.5 | | | 2 | 2 | | | 2 | 2 |
| TBBPA-BDBPE (%) | | | 2 | 2 | | | 2 | 2 | | |
| Perkadox 30 (%) | | 0.3 | 0.2 | | 0.2 | | 0.2 | | 0.2 | |
| UL-94 3.2 mm | NC | NC | NC | NC | NC | NC | NC | NC | NC | NC |
| UL-94 1.6 mm | NC | NC | NC | NC | NC | NC | NC | NC | NC | NC |

TABLE 2

Counter Examples C23 to C42 (polyolefins resins)

|  | C23 | C24 | C25 | C26 | C27 | C28 | C29 | C30 | C31 | C32 |
|---|---|---|---|---|---|---|---|---|---|---|
| LLDPE 1 (%) | 97 | 94 | 94.6 | 97 | 94 | 94.6 |  |  |  |  |
| LLDPE 2 (%) |  |  |  |  |  |  | 97 | 94 | 94.6 | 97 |
| 1-PB (%) |  |  |  |  |  |  |  |  |  |  |
| PMP (%) |  |  |  |  |  |  |  |  |  |  |
| Phoslite IP-A (%) |  |  |  | 1.8 | 3.6 | 3.6 |  |  |  | 1.8 |
| Phoslite IP-C (%) | 1.8 | 3.6 | 3.6 |  |  |  | 1.8 | 3.6 | 3.6 |  |
| Melagard MHB (%) | 0.9 | 1.8 | 1.8 | 0.9 | 1.8 | 1.8 | 0.9 | 1.8 | 1.8 | 0.9 |
| Perkadox 30 (%) | 0.3 | 0.6 |  | 0.3 | 0.6 |  | 0.3 | 0.6 |  | 0.3 |
| UL-94 3.2 mm | NC | NC | NC | NC | NC | NC | NC | NC | NC | NC |
| UL-94 1.6 mm | NC | NC | NC | NC | NC | NC | NC | NC | NC | NC |

|  | C33 | C34 | C35 | C36 | C37 | C38 | C39 | C40 | C41 | C42 |
|---|---|---|---|---|---|---|---|---|---|---|
| LLDPE 1 (%) |  |  |  |  |  |  |  |  |  |  |
| LLDPE 2 (%) | 94 | 94.6 |  |  |  |  |  |  |  |  |
| 1-PB (%) |  |  | 96 | 95.7 | 95 | 94.7 |  |  |  |  |
| PMP (%) |  |  |  |  |  |  | 96 | 95.7 | 95 | 94.7 |
| Phoslite IP-A (%) | 3.6 | 3.6 | 2 | 2 |  |  | 2 | 2 |  |  |
| Phoslite IP-C (%) |  |  |  |  | 3 | 3 |  |  | 3 | 3 |
| Melagard MHB (%) | 1.8 | 1.8 | 2 | 2 | 2 | 2 | 2 | 2 | 2 | 2 |
| Perkadox 30 (%) | 0.6 |  | 0.3 | 0.3 |  |  | 0.3 | 0.3 |  |  |
| UL-94 3.2 mm | NC | NC | NC | NC | NC | NC | NC | NC | NC | NC |
| UL-94 1.6 mm | NC | NC | NC | NC | NC | NC | NC | NC | NC | NC |

TABLE 3

Counter Examples C43 to C49 (EVA)

|  | C43 | C44 | C45 | C46 | C47 | C48 | C49 |
|---|---|---|---|---|---|---|---|
| EVA (%) | 98.9 | 97.8 | 98.9 | 97.8 | 87 | 81 | 81 |
| Phoslite IP-C (%) | 0.6 | 1.3 | 0.6 | 1.3 | 5 | 7 | 7 |
| Melagard MHB (%) | 0.3 | 0.7 |  |  | 8 | 12 |  |
| TBBPA-BDBPE (%) |  |  | 0.3 | 0.7 |  |  | 12 |
| Perkadox 30 (%) | 0.2 | 0.2 | 0.2 | 0.2 |  |  |  |
| UL-94 3.2 mm | NC | NC | NC | NC | NC | NC | NC |
| UL-94 1.6 mm | NC | NC | NC | NC | NC | NC | NC |

TABLE 4

Counter Examples C50 to C55 (Polyamides)

|  | C50 | C51 | C52 | C53 | C54 | C55 |
|---|---|---|---|---|---|---|
| PA-6 (%) | 99.7 | 97 | 96.7 |  |  |  |
| PA 6.6 (%) |  |  |  | 99.7 | 94.2 | 89.2 |
| Phoslite IP-C (%) |  | 1.8 | 1.8 |  | 5 | 10 |
| Melagard MHB (%) |  | 0.9 | 0.9 |  | 0.5 | 0.5 |
| Perkadox 30 (%) |  |  | 0.3 |  |  |  |
| EBS | 0.3 | 0.3 | 0.3 | 0.3 | 0.3 | 0.3 |
| UL-94 3.2 mm | V2 | V2 | V2 | V2 | NC | NC |
| UL-94 1.6 mm | V2 | V2 | V2 | V2 | NC | NC |
| LOI (%) | 25 | 21 | 20.8 | — | — | — |

TABLE 5

Counter Examples C56 to C66 (HIPS High Impact Poly Styrene)

|  | C56 | C57 | C58 | C59 | C60 | C61 | C62 | C63 | C64 | C65 | C66 |
|---|---|---|---|---|---|---|---|---|---|---|---|
| HIPS (%) | 95 | 94.6 | 92.3 | 91 | 96.4 | 94.4 | 93.4 | 93.4 | 95 | 94.6 | 91 |
| Phoslite IP-A (%) |  |  |  |  |  |  |  |  | 2.5 | 2.5 | 4.5 |

TABLE 5-continued

Counter Examples C56 to C66 (HIPS High Impact Poly Styrene)

|  | C56 | C57 | C58 | C59 | C60 | C61 | C62 | C63 | C64 | C65 | C66 |
|---|---|---|---|---|---|---|---|---|---|---|---|
| Phoslite IP-C (%) | 2.5 | 2.5 | 4.5 | 4.5 | 2 | 3 | 3 | 4 |  |  |  |
| Melagard MHB (%) | 2.5 | 2.5 | 2.5 | 4.5 |  |  |  |  | 2.5 | 2.5 | 4.5 |
| TBBPA-BDBPE (%) |  |  |  |  | 1 | 2 | 3 | 2 |  |  |  |
| Perkadox 30 (%) |  | 0.4 |  | 0.7 |  | 0.6 | 0.6 | 0.6 | 0.6 |  | 0.4 |
| UL-94 3.2 mm | NC | NC | NC | NC | NC | NC | NC | NC | NC | NC | NC |
| UL-94 1.6 mm | NC | NC | NC | NC | NC | NC | NC | NC | NC | NC | NC |

TABLE 6

Counter Examples C67 to C70 (ABS)

|  | C67 | C68 | C69 | C70 |
|---|---|---|---|---|
| ABS (%) | 81.6 | 81.3 | 81.6 | 81.3 |
| Phoslite IP-A (%) | 16 | 16 |  |  |
| Phoslite IP-C (%) |  |  | 16 | 16 |
| Melagard MHB (%) | 2.4 | 2.4 | 2.4 | 2.4 |
| Perkadox 30 (%) |  | 0.3 |  | 0.3 |
| UL-94 3.2 mm | NC | NC | NC | NC |
| UL-94 1.6 mm | NC | NC | NC | NC |

TABLE 7

Counter Examples C71 to C86 (TPO and Plastomers)

|  | C71 | C72 | C73 | C74 | C75 | C76 | C77 | C78 |
|---|---|---|---|---|---|---|---|---|
| TPO-1 (%) | 81.6 | 81.3 | 81.6 | 81.3 |  |  |  |  |
| TPO-2 |  |  |  |  | 81.6 | 81.3 | 81.6 | 81.3 |
| PLAS-1 |  |  |  |  |  |  |  |  |
| PLAS-2 |  |  |  |  |  |  |  |  |
| Phoslite IP-A (%) | 16 | 16 |  |  | 16 | 16 |  |  |
| Phoslite IP-C (%) |  |  | 16 | 16 |  |  | 16 | 16 |
| Melagard MHB (%) | 2.4 | 2.4 | 2.4 | 2.4 | 2.4 | 2.4 | 2.4 | 2.4 |
| Perkadox 30 (%) |  | 0.3 |  | 0.3 |  | 0.3 |  | 0.3 |
| UL-94 3.2 mm | NC | NC | NC | NC | NC | NC | NC | NC |
| UL-94 1.6 mm | NC | NC | NC | NC | NC | NC | NC | NC |

|  | C79 | C80 | C81 | C82 | C83 | C84 | C85 | C86 |
|---|---|---|---|---|---|---|---|---|
| TPO-1 (%) |  |  |  |  |  |  |  |  |
| TPO-2 |  |  |  |  |  |  |  |  |
| PLAS-1 | 81.6 | 81.3 | 81.6 | 81.3 |  |  |  |  |
| PLAS-2 |  |  |  |  | 81.6 | 81.3 | 81.6 | 81.3 |
| Phoslite IP-A (%) | 16 | 16 |  |  | 16 | 16 |  |  |
| Phoslite IP-C (%) |  |  | 16 | 16 |  |  | 16 | 16 |
| Melagard MHB (%) | 2.4 | 2.4 | 2.4 | 2.4 | 2.4 | 2.4 | 2.4 | 2.4 |
| Perkadox 30 (%) |  | 0.3 |  | 0.3 |  | 0.3 |  | 0.3 |
| UL-94 3.2 mm | NC | NC | NC | NC | NC | NC | NC | NC |
| UL-94 1.6 mm | NC | NC | NC | NC | NC | NC | NC | NC |

TABLE 8

Counter Examples C87 to C90 (PBT)

|  | C87 | C88 | C89 | C90 |
|---|---|---|---|---|
| PBT (%) | 94.7 | 94.4 | 89 | 88.7 |
| Phoslite IP-A (%) | 4.3 | 4.3 | 10 | 10 |
| Melagard MHB (%) | 0.7 | 0.7 | 0.7 | 0.7 |
| Perkadox 30 (%) |  | 0.3 |  | 0.3 |
| PETS | 0.3 | 0.3 | 0.3 | 0.3 |
| UL-94 3.2 mm | NC | NC | NC | NC |
| UL-94 1.6 mm | NC | NC | NC | NC |

The Counter Examples reported from C1 to C90 (Tables 1 to 8) show that the combination of an hypophosphorous metal salt and an halogen containing compound, with or without a synergic radical initiator, are indeed not effective in improving the flame retardancy of a wide range of polyolefins and condensation polymers, as for example is instead generally described in WO 2007/010318, but it is indeed effective only in retarding the flammability of polypropylene homopolymers and copolymers, as indicated in the examples WO 2007/010318. In other words, even if WO 2007/010318 discloses in general terms the flame retardant activity of hypophosphorous metal salts and halogen containing compounds, with or without a synergic radical initiator, in polyolefins, polystyrenes included, the only flame retardant activity of such disclosed compositions is effective if the polyolefin is selected as polypropylene. The fact that the combination of hypophosphorous metal salt, halogen containing compound and a radical initiator is highly effective in retarding flammability of polystyrene is therefore to be considered as unexpected and surprising.

2) Examples and Comparative Examples on Polystyrene

In the following examples the below indicated materials were used as blends components:

Resins:

Polystyrene 1: PS 158 K from BASF, herein briefly called "PS-1"

Polystyrene 2: general purpose crystal polystyrene with MFR 230° C., 2.16 kg=10 gr/10', herein briefly called "PS-2"

Flame Retardant Additives:

Phoslite™ IP-A (Aluminium hypophosphite) manufactured by Italmatch Chemicals Spa. The used powder has got an average particle size (d50%) of 5 μm and d 98% below 15 μm;

Phoslite™ IP-C (Calcium Hypophosphite) manufactured by Italmatch Chemicals Spa. The used powder has got an average particle size of 5 μm and d 98% below 15 μm;

Melamine hydrobromide manufactured by Italmatch Chemicals Spa; with average particle size (d50%) of 5 μm; herein briefly called "MHB", with halogen content around 35%

Tetrabromobisphenol A bis(2,3-dibromopropyl ether), CAS 21850-44-2, herein briefly called "TBBPA-BDBPE", with halogen content around 70% Hexabromocyclododecane, herein briefly called "HBCDC", with halogen content around 75%

Synergic Organic or Radical Initiator:

2,3-dimethyl 2,3-diphenylbutane (Perkadox 30™) commercialized by Akzo.

Other Additives:

Erucamide (Amid E™) commercialized by Akzo

Mixture hindered phenol I phosphite (Irganox B215) commercialized by BASF The components reported in table 1 are compounded in a twin screw extruder set at temperature between 160° C. and 200° C. After granulation and drying the pellets were injection molded into test specimens intended to be used for the flammability test in accordance to the Underwriters Laboratories Standards UL-94.

Thermal stability of the different blends is evaluated in a 100 cc brabender chamber after 10 minutes permanent time at 200° C. both in terms of yellowing (visual) and MFR change at 240° C. and 2.16 kg (measured according to ISO 1133 standard).

TABLE 9

Counter Examples C91 to C100 and Examples Ex101 to Ex110 on Polystyrene resin

| | C91 | C92 | C93 | C94 | C95 | C96 | C97 | C98 | C99 | C100 | Ex101 |
|---|---|---|---|---|---|---|---|---|---|---|---|
| PS-1 | 98.9% | 99.2% | 98.4% | 98.4% | 96% | 96% | 95.6% | 95.6% | 98% | 98% | 99% |
| Phoslite IP-C | — | — | — | — | 4% | — | 4% | — | — | — | 0.3% |
| Phoslite IP-A | — | — | — | — | — | 4% | — | 4% | — | — | — |
| MHB | — | — | — | 1.6% | — | — | — | — | 1.6% | — | 0.6% |
| HBCDC | 1.1% | 0.8% | — | — | — | — | — | — | — | — | — |
| TBBPA-BDBPE | — | — | 1.6% | — | — | — | — | — | — | 1.6% | — |
| Perkadox 30 | — | — | — | — | — | — | 0.4% | 0.4% | 0.4% | 0.4% | 0.1% |
| Total FR | 1.1% | 0.8% | 1.6% | 1.6% | 4% | 4% | 4.4% | 4.4% | 2% | 2% | 1% |
| Halogen content | 0.82% | 0.60% | 1.1% | 0.56% | 0 | 0 | 0 | 0 | 0.56% | 1.1% | 0.21 |
| Thermal stability 10' 200° C. * | S | S | G | E | E | E | E | E | E | G | E |
| UL-94 3.2 mm | V2 | NC | NC | NC | NC | NC | NC | NC | NC | NC | NC |
| UL-94 1.6 mm | V2 | V2 | NC | NC | NC | NC | NC | NC | NC | NC | V2 |

| | | Ex102 | Ex103 | Ex104 | Ex105 | Ex106 | Ex107 | Ex108 | Ex109 | Ex110 |
|---|---|---|---|---|---|---|---|---|---|---|
| | PS-1 | 98.5% | 97% | 96% | 99% | 98.5% | 99% | 98.5% | 99% | 98.5% |
| | Phoslite IP-C | 0.45% | 1.8% | 2.4% | 0.6% | 0.9% | — | — | 0.45% | 0.68% |
| | Phoslite IP-A | — | — | — | — | — | 0.4% | 0.6% | — | — |
| | MHB | 0.9% | 0.9% | 1.2% | — | — | 0.4% | 0.6% | — | — |
| | HBCDC | — | — | — | 0.3% | 0.45% | — | — | — | — |
| | TBBPA-BDBPE | — | — | — | — | — | — | — | 0.45% | 0.67% |
| | Perkadox 30 | 0.15% | 0.3% | 0.4% | 0.1% | 0.15% | 0.2% | 0.3% | 0.1% | 0.15% |
| | Total FR | 1.5% | 3% | 4% | 1% | 1.5% | 1% | 1.5% | 1% | 1.5% |
| | Halogen content | 0.32% | 0.32% | 0.42% | 0.22% | 0.34% | 0.21 | 0.32% | 0.32% | 0.47% |
| | Thermal stability 10' 200° C. * | E | E | E | G | G | E | E | E | E |
| | UL-94 3.2 mm | V2 | V2 | V2 | NC | V2 | V2 | V2 | NC | V2 |
| | UL-94 1.6 mm | V2 | NC | V2 | V2 | V2 | NC | V2 | V2 | V2 |

* S = sufficient, G = good, E = excellent

Examples 101-102

Table 9

The comparative examples C94 and C99 show that MHB as a sole additive at 1.6% by weight on the total percentage of the composition and in combination with the organic synergic additive at 2% by weight on the total percentage of the composition does not give satisfactory flame retardancy according to UL-94. Comparative examples C95 and C97 show that the inorganic calcium hypophosphite, as such at 4% loading or in combination with the organic synergic at 4.4% loading, does not give satisfactory flame retardancy according to UL-94. Examples 101 and 102 show that at a total loading of 1.5% the combination of inorganic hypophosphite, halogen containing additive and synergic give satisfactory UL-94 results and low halogen content compared with comparative example C91 or C92, without presence of hexabromocyclododecane.

Examples 103-104

Table 9

The comparative examples C94 and C99 show that MHB as a sole additive at 1.6% and in combination with the organic synergic additive at 2% total loading does not give satisfactory flame retardancy according to UL-94. Comparative examples C95 and C97 show that the inorganic calcium hypophosphite, as such at 4% loading or in combination with the organic synergic at 4.4% loading, does not give satisfactory flame retardancy according to UL-94. Examples 103 and 104 show that at a total loading of 4% the combination of inorganic hypophosphite, halogen containing additive and synergic give satisfactory UL-94 results and low halogen content compared with comparative example C91 or C92, without presence of hexabromocyclododecane.

Examples 105-106

Table 9

The comparative examples C91 and C92 show that HBCDC as a sole additive needs at least 0.8%-1.1% to give satisfactory flame retardancy according to UL-94. Comparative examples C95 and C97 show that the inorganic calcium hypophosphite, as such at 4% loading or in combination with the organic synergic at 4.4% loading, does not give satisfactory flame retardancy according to UL-94. Examples 105 and 106 show that at a total loading of 1.5% the combination of inorganic hypophosphite, halogen containing additive and synergic give satisfactory UL-94 results and low halogen content if compared with comparative example C91 or C92, with a lower content of hexabromocyclododecane.

Examples 107-108

Table 9

The comparative examples C94 and C99 show that MHB as a sole additive at 1.6% and in combination with the organic synergic additive at 2% total loading does not give satisfactory flame retardancy according to UL-94. Comparative examples C96 and C98 show that the inorganic aluminium hypophosphite, as such at 4% loading or in combination with the organic synergic at 4.4% loading, does not give satisfactory flame retardancy according to UL-94. Examples 107 and 108 show that at a total loading of 1.5% the combination of inorganic hypophosphite, halogen containing additive and synergic give satisfactory UL-94 results and low halogen content compared with comparative example C91 or C92, without presence of hexabromocyclododecane.

Examples 109-110

Table 9

The comparative examples C93 and C100 show that TBBPA-BDBPE as a sole additive at 1.6% or in combination with the organic synergic at 2% total loading does not give satisfactory flame retardancy according to UL-94. Comparative examples C95 and C97 show that the inorganic calcium hypophosphite, as such at 4% loading or in combination with the organic synergic at 4.4% loading, does not give satisfactory flame retardancy according to UL-94. Examples 109 and 110 show that at a total loading of 1.5% the combination of inorganic hypophosphite, halogen containing additive and synergic give satisfactory UL-94 results and low halogen content compared with comparative example C1 or C2, without presence of hexabromocyclododecane.

In the above mentioned formulations based on inorganic hypophosphites, halogen additives and organic containing synergic mixtures, the minimum bromine content results to be around 1000 ppm.

3) Example 111

The following composition is mixed into a Plasmec low speed mixer for 2 hours, than dosed to a Coperion twin screw extruder 24 mm with a temperature profile in the range 160° C.-200° C., strands are water cooled and pelletized:
PS-1 in powder=49 kg
HBCDC=50 kg
Amid E=0.30 kg
Irganox B215=0.15 kg 4) Example 112

The following composition is mixed into a Plasmec low speed mixer for 2 hours, than dosed to a Coperion twin screw extruder 24 mm with a temperature profile in the range 160° C.-200° C., strands are water cooled and pelletized:
PS-1 in powder=49 kg
Phoslite IP-C=15 kg
MHB=30 kg
Perkadox 30=5 kg
Armid E=0.30 kg
Irganox B215=0.15 kg 5) Example 113

The following composition is mixed into a Plasmec low speed mixer for 2 hours, than dosed to a Coperion twin screw extruder 24 mm with a temperature profile in the range 160° C.-200° C., strands are water cooled and pelletized:
PS-1 in powder=49 kg
Phoslite IP-C=30 kg
HBCDC=15 kg
Perkadox 30=5 kg
Armid E=0.30 kg
Irganox B215=0.15 kg 6) Example 114

The following composition is mixed into a Plasmec low speed mixer for 2 hours, than dosed to a Coperion twin screw extruder 24 mm with a temperature profile in the range 160° C.-200° C., strands are water cooled and pelletized:
PS-1 in powder=49 kg
Phoslite IP-C=23 kg
TBBPA-BDBPE=22 kg
Perkadox 30=5 kg
Amid E=0.30 kg
Irganox B215=0.15 kg 7) Examples 25, 26, 27, 28

Pellets from Example 111, 112, 113 and 114 are dosed into a single screw extruder line equipped with gas inlet and flat die at a foaming rate of 80 kg/h and with the dosing percentage show in table 10. A carbon dioxide mixture with ethanol is injected into the screw to form a foamable composition at a pressure of 100 bars, cooled to 120° C. and foamed through the flat die at atmospheric pressure to get the density and thicknesses shown in table 10. Flame test on foamed boards are performed 3 weeks after extrusion. Results are summarized in table 10:

TABLE 10

Example on Polystyrene Foams

| | Comparative 115 | Example 116 | Example 117 | Example 118 |
|---|---|---|---|---|
| PS | 98% | 97% | 97% | 97% |
| Masterbatch | Ex. 111 = 2% | Ex 112 = 3% | Ex. 113 = 3% | Ex. 114 = 3% |
| Foam thickness (mm) | 35 | 34 | 35 | 35 |
| Density (kg/m3) | 34 | 35 | 36 | 35 |
| Bromine content | 1.18% | 0.31% | 0.36% | 0.49% |
| Halogen product | HBCDC | MHB | HBCDC | TBBPA-BDBPE |
| DIN 4102 B2 | Passed | Passed | Passed | Passed |
| EN 11952-2 ignitability | Passed | Passed | Passed | Passed |

Examples 116, 117, 118 show that it is possible to have extruded foam polystyrene flame retarded compositions with low content of halogen, HBCD or even HBCD free (as in the preferred Example 116 and Example 118).

3) Examples and Comparative Examples on Polystyrene and Polypropylene

In the following examples the below indicated materials were used as blends components:

Resins:
Polystyrene 3: crystal polystyrene with MFR 200° C., 5 kg=5.4 gr/10', herein briefly called "PS-3"
Polystyrene 4: crystal polystyrene with MFR 200° C., 5 kg=9.6 gr/10', herein briefly called "PS-4"
Polypropylene 1: Polypropylene homopolymer with MFR 200° C., 5 kg=7 gr/10', herein briefly called "PP-1"
Flame Retardant Additives:

Phoslite™ IP-A (Aluminium hypophosphite) manufactured by Italmatch Chemicals Spa. The used powder has got an average particle size (d50%) of 5 µm and d 98% below 15 µm;

Melamine hydrobromide manufactured by Italmatch Chemicals Spa; with average particle size (d50%) of 5 µm; herein briefly called "MHB", with halogen content around 35%

Organic Synergic or "Radical Initiator" (RI):
2,3-dimethyl 2,3-diphenylbutane (Perkadox 30™) commercialized by Akzo.

"Radical Stopper" (RS):
Di tert butyl hydroquinone, CAS 88-58-4, herein briefly called "RS-1"

Molecular Mass Distribution and Melt Flow Index Measurements

An Agilent 1200 liquid chromatography system equipped with a refractometric detector was used to determine the average molecular weight of samples. The GPC columns were fitted with 3 10 microns "Plgel" columns with pore sizes of $10^3$, $10^4$, $10^5$ Amstrong. Tetrahydrofuran was used as an eluent at a flow rate of 1 mL/min at 25° C. The molecular weight of the polymers was determined by the calibration curves obtained from polystyrene standard samples.

A CEAST manual standards plastomer instrument was used to determine the MFRs of the samples according to ASTM D1238 at 200° C./5 kg.

The components reported in table 11 are compounded in a twin screw extruder set at the indicated temperatures. After granulation and drying the pellets were submitted to MWD and MFR measurements, injection molded into test specimens for the flammability test in accordance to the Underwriters Laboratories Standards UL-94.

TABLE 11

Examples and Comparative Examples on PS and PP

| | C119 | C120 | E121 | E122 | E123 | C124 | E125 | C126 | C127 |
|---|---|---|---|---|---|---|---|---|---|
| PS-3 | 100% | | 98.5% | | 98.5% | 98.5% | 98.35% | | |
| PS-4 | | 100% | | 98.5% | | | | | |
| PP-1 | | | | | | | | 98.5% | 98.5% |
| Phoslite IP-A | — | — | 0.6% | 0.6% | 0.6% | 0.6% | 0.6% | 0.6% | 0.6% |
| MHB | — | — | 0.6% | 0.6% | 0.6% | 0.6% | 0.6% | 0.6% | 0.6% |
| Perkadox 30 | — | — | 0.3% | 0.3% | 0.3% | 0.3% | 0.3% | 0.3% | 0.3% |
| RS-1 | — | — | — | — | — | — | 0.15% | — | — |
| Extr. Temp. | 200° C. | 200° C. | 200° C. | 200° C. | 220° C. | 240° C. | 240° C. | 200° C. | 250° C. |
| MFR | 5.5 | 9.7 | 5.7 | 9.8 | 5.9 | 6.2 | 6.0 | 7.2 | 10.5 |
| Mw | 306000 | 238000 | 307000 | 238000 | 276000 | 273000 | 276000 | — | — |
| UL-94 3.2 mm | NC | NC | V2 | V2 | NC | NC | V2 | V2 | V2 |
| UL-94 1.6 mm | NC | NC | V2 | V2 | V2 | NC | V2 | V2 | V2 |

Comments to Examples and Comparative Examples in Table 11.

Comparing Example E121 and E122 with Comparative Examples C119 and C120 it is shown that it is possible to have flame retardant polystyrene polymers with different molecular weight and viscosity according to the present claimed compositions. Comparing Example E123 and Comparative Example C124 it is shown that decreasing the molecular weight of polystyrene to 90% of the original after processing brings to not flame retarded final products (NC). Introduction of a so called Radical Stopper (Example E125) is efficient in reducing the molecular weight drop after processing and taking to flame retardants products. Comparative Examples C126 and C127 show that even a sharp increase in fluidity in polypropylene after severe processing is not linked to a decrease in flame retardancy.

4) Example and Comparative Example on Polystyrene and Polar Polymers

Pellets from Example 112 and Example 114 are dosed into a single screw extruder line equipped with gas inlet and flat die at a foaming rate of 80 kg/h and with the dosing percentage and foaming agents show in table 12. Material is foamed through a flat die to get the density and thicknesses shown in table 12. Flame test on foamed boards are performed 3 weeks after extrusion. Results are summarized in table 1:

POL-1: Lucalen A2920, low density polyethylene copolymer produced by Lyondell Basell, having a density=0.927 gr/cc and consisting of a copolymer of Ethylene/Acrylic acid/t-butilacrylate having 4% of acrylic acid and 7% f t-butylacrylate, and MFR (190° C./2.16 kg)=7 gr/10'

POL-2: Ineos B28N230, low density polyethylene copolymer produced by Ineos, having a density of 0.924 gr/cc and consisting of a copolymer Ethylene/t-butyl acrylate having 15% of t-butyl acrylate and MFR (190° C./2.16 kg)=8 gr/10'

TABLE 12

Example on Polystyrene Foams and Polar Polymers

| | Example 128 | Comparative 129 | Example 130 | Example 131 | Example 133 |
|---|---|---|---|---|---|
| PS | 97% | 97% | 95.5% | 95.5% | 97% |
| Masterbatch | Ex. 112 = 3% | Ex. 112 = 3% | Ex. 112 = 3% | Ex. 112 = 3% | Ex. 114 = 3% |
| Gas | H2O/Ethanol | CO2 | CO2 | CO2 | CO2 |
| POL-1 | | | 1.5% | | |
| POL-2 | | | | 1.5% | |
| Foam thickness (mm) | 50 | Not extrudable | 50 | 50 | 50 |
| Cell size | Standard | Very small | Standard | Small | Small |
| Density (kg/m3) | 34 | — | 34 | 39 | 39 |
| DIN 4102 B2 | Passed | Passed | Passed | Passed | Passed |

Comments to Example and Comparative Examples in Table 12

Comparing Examples E128 with Comparative C129 it is shown the effect of using a pure CO2 expanding gas compared to a more polar water/alcohol mixture. Example C129 does not bring to an expandable foam utilizing a pure CO2, but the introduction of a polar polymer (POL-1) in Example E130 increase cell size and foam quality, as well as POL-2 reported in Example E131 does improve the cell size even if at a minor extent. Example E133 contains TBBPA-BDBPE as an halogen source. TBBPA-BDPE is a low melting point organic molecules, so the total inorganic of the composition is reduced as well as the nucleating effect on the foam.

The invention claimed is:

1. Flame retarded polystyrene compositions containing:
   (A) at least a polystyrene crystal homopolymer,
   (B) at least an inorganic hypophosphite,
   (C) at least an halogen containing molecule or polymer,
   (D) at least an "organic synergic" or "radical initiator" (RI),
   wherein said polystyrene, after processing, has a weight average molecular weight (Mw) of at least 90% of the polystyrene in an identical composition without said compounds (B), (C) and (D) and wherein B), C) and D) together comprise between 0.5% and 3% by weight with respect to the total weight of the composition.

2. Compositions according to claim 1, characterized in that they further comprises:
   (E) at least a "radical stopper" (RS).

3. Compositions according to claim 1, characterized in that they further comprises:
   (F) at least a polar polymer.

4. Compositions according to claim 1, characterized in that they further comprises:
   (E) at least a "radical stopper" (RS), and
   (F) at least an oxygen containing polar polymer.

5. Composition according to claim 1, characterized in said inorganic hypophosphite is calcium or aluminum hypophosphite.

6. Composition according to claim 2, characterized in said inorganic hypophosphite is calcium or aluminum hypophosphite.

7. Composition according to claim 3, characterized in said inorganic hypophosphite is calcium or aluminum hypophosphite.

8. Compositions according to claim 1, characterized in that said halogen containing molecule or polymer is melamine hydrobromide.

9. Compositions according to claim 2, characterized in that said halogen containing molecule or polymer is melamine hydrobromide.

10. Compositions according to claim 3, characterized in that said halogen containing molecule or polymer is melamine hydrobromide.

11. Compositions according to claim 1, characterized in that the final halogen content is lower than 0.8% by weight with respect to the total weight of the composition.

12. Composition according to claim 1, characterized in that said "organic synergic" or "radical initiator" (RI) is selected among one or more of the following products: 2,3-dimethyl 2,3-diphenyl butane, 2,3-dimethyl 2,3-diphenylhexane, poly (1,4-diisopropyl benzene), dicumyl peroxide or di-tert-butyl peroxide.

13. Compositions according to claim 2, characterized in that the E) component is selected between di-tert-butyl-hydroquinone or 4-hydroxyl-tetrahydrocarbylpiridin-1 oxyl.

14. Compositions according to claim 3, characterized in that the F) component is selected among EVA, EMA, EEA, EBA, PVA, PE-g-MAH, SBS-g-MAH, PS-g-MAH, SAN, ABS.

15. Composition according to claim 3, characterized in that the F) component is a reactor grade copolymer containing an oxydrilic or carboxylic free functional group.

16. Composition according to claim 3, characterized in that the F) component is a brominated butadiene or a brominated styrene butadiene copolymer.

17. Compositions according to claim 3, characterized in that the F) component is comprised between 0.5 and 5% by weight with respect to the total weight of the composition.

18. Extruded articles based on compositions according to claim 1, characterized in that they have a density from about 15 kg/m$^3$ to about 60 kg/m$^3$.

19. Extruded articles based on compositions according to claim 2, characterized in that they have a density from about 15 kg/m$^3$ to about 60 kg/m$^3$.

20. Extruded articles based on compositions according to claim 3, characterized in that they have a density from about 15 kg/m³ to about 60 kg/m³.

21. Polystyrene compositions according to claim 1 for use as flame retardant polymeric compositions in the preparation of extruded foamed articles.

* * * * *